Jan. 20, 1970   L. MAIOCCHI   3,490,510
COUPLING PROFILES IN REMOVABLE TREAD TIRES
Filed Jan. 4, 1967

INVENTOR
Luigi Maiocchi

BY Stevens, Davis, Miller & Mosher
ATTORNEYS

3,490,510
COUPLING PROFILES IN REMOVABLE TREAD TIRES
Luigi Maiocchi, Milan, Italy, assignor to Pirelli, Societa per Azioni, Milan, Italy
Filed Jan. 4, 1967, Ser. No. 607,228
Claims priority, application Italy, Jan. 25, 1966, 1,690/66
Int. Cl. B60c 11/02
U.S. Cl. 152—187                           4 Claims

ABSTRACT OF THE DISCLOSURE

A pneumatic tire having a carrying casing and a removable tread ring extending over the casing and frictionally engaging same upon inflation of the tire, the engaging surfaces of the casing and the tread ring each being provided with a set of longitudinally extending grooves or longitudinally extending complementary ridges which engage to permit the tread ring to be centered with respect to the casing. When the tire is in a deflated condition, the distance between the midlines of the ridges or grooves on the casing is less than that of the ridges or grooves on the tread ring, the difference in these distances being such that, upon inflation of the tire, the distances are equal.

BACKGROUND OF THE INVENTION (1) Field of the invention

The present invention relates to pneumatic tires of the so-called "removable tread" type, and more particularly, to pneumatic tires consisting of a tread ring and a carrying casing on which the tread ring is assembled.

(2) Description of the prior art

Pneumatic tires of this kind, in which the tread ring is fastened to the carrying casing by virtue of the friction forces which are generated between the two units when the tire is in an inflated condition, are already known. To obtain this effect, the tread ring is provided with an internal reinforcement which makes it inextensible in a circumferential direction. Also, the ring has an inner diameter smaller than that of the outer diameter of the carrying casing if the latter were inflated devoid of the tread ring.

In tires of this kind, the friction forces due to the inflation pressure are generally sufficient to insure the perfect fastening of the two units constituting the tire, and consequently the coupling surfaces between the carrying casing and the tread ring could be perfectly smooth and cylindrical.

However, it has been experimentally ascertained that considerable advantages are obtained if the coupling surfaces are provided with longitudinal grooves and ridges complementary to one another in the two units of the tire, since this arrangement permits a perfect centering of the tread ring on the carrying casing. Moreover, during travel of the vehicle, these grooves and ridges prevent repeated transversal stresses in the same direction and sense, which may cause a displacement of the tread ring.

In fact, it also has been experimentally ascertained that, during cornering, if the tire is running in abnormal conditions (too low a pressure and high a speed with respect to the radius of the curve, etc.), the carrying casing may deform in such a way as to detach from the tread ring in the marginal portion of the latter. This phenomenon can obviously become dangerous, since it gives rise to a reduction of the coupling surface between the tread ring and the carrying casing. This detachment is never sufficient to allow the tread ring to come completely free from the carcass, but it can be sufficient to cause a small displacement of one unit with respect to the other, the cumulative effect of these displacements in the case of several sharp curves in the same direction causing a very large, and therefore dangerous, displacement.

Attempts have been made to eliminate this drawback by providing longitudinal ridges which remain engaged in their corresponding groves even when a slight detachment takes place between the carcass and the tread. Although this arrangement solves the above indicated problem, it has the additional disadvantage of causing serious damage to the tire, which is probably due to the fact that during the inflation of the tire and subsequent use thereof, the carcass suffers an elongation, which is partially permanent, and which causes the ridges or grooves present on the carrying casing to detach from one another, thus originating shear stresses, since the corresponding grooves or ridges present on the tread ring cannot follow said movement due to the inextensible internal reinforcement present in the latter.

SUMMARY OF THE INVENTION

It is therefore an object of the present invention to provide a pneumatic tire having longitudinal ridges and grooves, in which the above-mentioned inner stresses are eliminated, and their disadvantageous consequences thus prevented.

In general, the removable tread tire of the present invention consists of two units, namely a tread ring provided with a reinforcement inextensible in the longitudinal direction, and a carrying casing, the coupling profile between the two units comprising at least two longitudinal grooves provided in one of the units which encases corresponding longitudinal ridges protruding from the other unit. The tire is further characterized in that, when the two units are separated from each other, the axial distance between the midlines of the ridges or grooves present on the carrying casing is smaller than the axial distance between the midlines of the ridges or grooves present on the tread ring, the value of the difference between said distances being such that said distances become equal during the tire service. In this manner the above-mentioned damage in the grooves and in the longitudinal ridges is eliminated.

The value to be assigned to the difference between the distance between the ridges or grooves on the carrying casing, and the distance between the ridges or grooves on the tread ring must be selected by taking into account the many variables which determine the elongation of the carcass under service, as for instance the material consisting of the carcass, the number of the plies, the inflation pressure, and so on. In any case, this difference must not be greater than seven percent of the distance between the ridges or grooves present on the carrying casing.

According to a preferred embodiment of the invention, said difference is between 0.5 percent and 5 percent of said distance.

Still according to a preferred embodiment, the ridges are disposed on the inner surface of the tread ring, while the corresponding grooves are obtained on the outer surface of the carrying casing.

BRIEF DESCRIPTION OF THE DRAWINGS

The present invention will now be better described with reference to the attached drawings, given by way of non-limiting example, in which.

DESCRIPTION OF THE PREFERRED EMBODIMENTS

Figure 1:
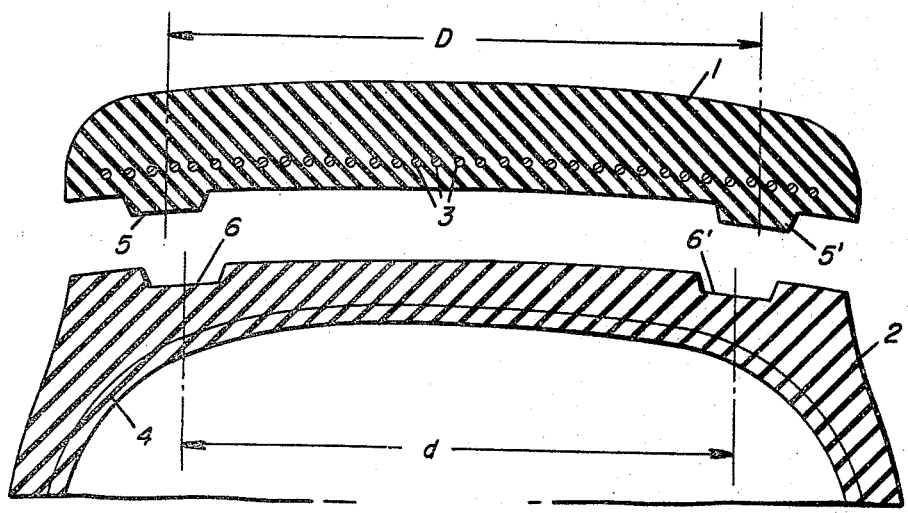
FIG. 1 represents, in section, a tread ring and a carrying casing of a pneumatic tire according to the present invention.

FIG. 1 represents a removable tread tire consisting of two units, namely a tread ring 1 and a carrying casing 2. The tire represented is of the type in which the fastening of the two units is due to the inflation pressure of the tire, and therefore the tread ring 1 is provided with a reinforcing structure 3, which is inextensible in the longitudinal direction. The carrying casing 2 is provided with a carcass 4 which is diagrammatically indicated with a continuous line, and which consists of a plurality of plies having radial cords which may be, for example, rayon cords SR 1652.

The coupling profile between the tread ring and the carrying casing shows two longitudinal ridges 5 and 5', projecting from the tread ring, which are respectively encased in the grooves 6 and 6', provided on the carrying casing, these ridges and grooves all having a trapezoidal cross section.

As it can be seen from FIG. 1, the axial distance $d$ between the midlines of the grooves 6 and 6' is smaller than the axial distance D between the midlines of the ridges 5 and 5'. In the figure, the difference between the two distances is purposely enlarged for the sake of clearness, it being understood that these distances may vary from those as shown. Actually, in a 11.00–20 tire intended to work at a pressure of 8 kg./cm.$^2$, and having a carcass as described above, the two distances D and $d$ may have, for example, the value of 116 mm. and 114 mm., respectively.

Figure 2:
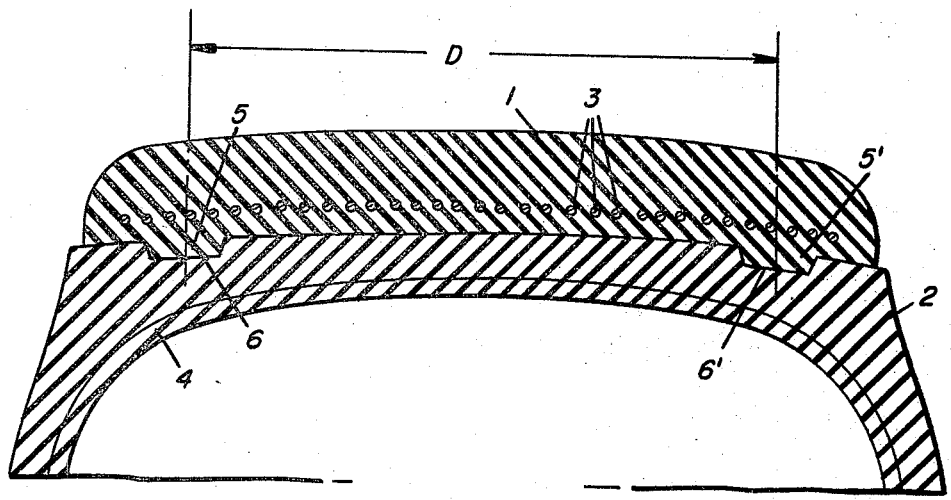
FIG. 2 represents, in section, the pneumatic tire of FIG. 1 in an inflated condition.

FIG. 2 shows the tire in an inflated condition with the tread ring 1 assembled on the carrying casing 2. As shown, the carcass 4 has expanded, thus causing an increase in the distance $d$, this increase being calculated in such a manner that the value $d$ becomes equal to D.

It should be noted that if the two distances $d$ and D were equal before inflation of the tire as in the conventional tires, the expansion of the carcass 4 would obviously cause shear stresses in the ridges 5 and 5'.

What is claimed is:
1. A removable tread tire having a carrying casing member and a removable tread ring extending over said casing and frictionally engaging same upon inflation of the tire, wherein the improvement comprises at least one set of engaging members formed on the engaging surface of said casing and on the engaging surface of said ring, one set of engaging members comprising at least two longitudinally extending ridges and the other set of engaging members comprising at least two longitudinally extending complementary grooves, the axial distance between the midlines of the engaging members on said casing being smaller than the axial distance between the midlines of the engaging members on the tread ring when the tire is deflated, the difference in said distance being such that, upon inflation of the tire, the distances are equal.

2. A pneumatic tire as in claim 1, wherein the value of the difference between said distances is not greater than seven percent of the distance between the midlines of the engaging members on the carrying casing.

3. A pneumatic tire as in claim 2, wherein the value of said difference is between 0.5 percent and 5 percent of the distance between the midlines of the engaging members on the carrying casing.

4. A pneumatic tire as in claim 1, wherein the ridges are provided on the inner surface of said ring, while the corresponding grooves are provided on the outer surface of said casing.

References Cited

UNITED STATES PATENTS

| | | | |
|---|---|---|---|
| 647,190 | 4/1900 | Lins et al. | 152—188 |
| 1,707,014 | 3/1929 | Hopkinson | 152—187 |
| 2,232,001 | 2/1941 | Hawkinson | 152—187 |
| 2,609,026 | 9/1952 | Luchsinger-Caballero | 152—176 |

ARTHUR H. LA POINT, Primary Examiner

CHARLES B. LYON, Assistant Examiner